D. D. STEPHENS.
PLANTER.
APPLICATION FILED AUG. 15, 1911.

1,131,013.

Patented Mar. 9, 1915

WITNESSES
Robert M. Sutphen
E. W. Cady

INVENTOR
Dewey D. Stephens
By E. E. Vrooman
his Attorney.

UNITED STATES PATENT OFFICE.

DEWEY D. STEPHENS, OF AINSWORTH, IOWA.

PLANTER.

1,131,013.  Specification of Letters Patent.  Patented Mar. 9, 1915.

Continuation in part of application Serial No. 394,860, filed September 27, 1907. This application filed August 15, 1911. Serial No. 644,118.

*To all whom it may concern:*

Be it known that I, DEWEY D. STEPHENS, a citizen of the United States, residing at Ainsworth, in the county of Washington and State of Iowa, have invented certain new and useful Improvements in Planters, of which the following is a specification, reference being had therein to the accompanying drawing.

This invention relates to planters and more especially to corn planters of the check row type.

The object of the invention is to provide an improved planter for simultaneously planting three rows.

A planter embodying my invention is provided with three ground wheels and three seeder mechanisms each arranged adjacent to and preferably in advance of a ground wheel. The planter is therefore well adapted for use on uneven ground as each depositing mechanism is maintained at a uniform depth by the adjacent ground wheel. Each ground wheel serves to cover the seeds deposited by one of the seeder mechanisms, and the forward ground wheel is connected to the tongue and serves as a steering device.

In my co-pending application for fifth wheel structure, filed September 27, 1907, Serial No. 394,860, I have disclosed and claimed a mounting for the forward wheel of a planter in many respects similar to that herein shown. I do not, therefore, claim as a part of my present invention the specific form of mounting for the forward wheel. In the said application I have also disclosed a relative arrangement of seeder devices and wheels similar to that herein disclosed, and as to that subject-matter this present application is therefore a continuation of my said application 394,860.

My co-pending application, Ser. No. 661,270, for check row mechanism for planters, filed November 20, 1911, relates to a planter provided with improved mechanism by means of which three triangularly arranged seeder devices can be intermittently operated under the control of a check row wire or an equivalent device. My co-pending application, Serial No. 661,271, for elevating mechanism for corn planters, filed November 20, 1911, relates to a planter provided with mechanism for simultaneously raising and lowering three separate, triangularly arranged seeder devices. I do not, therefore, claim as parts of my present invention the three triangularly arranged seeder devices adapted to be simultaneously or intermittently operated, nor do I claim means for simultaneously raising and lowering three triangularly arranged seeder devices.

Figure 1:
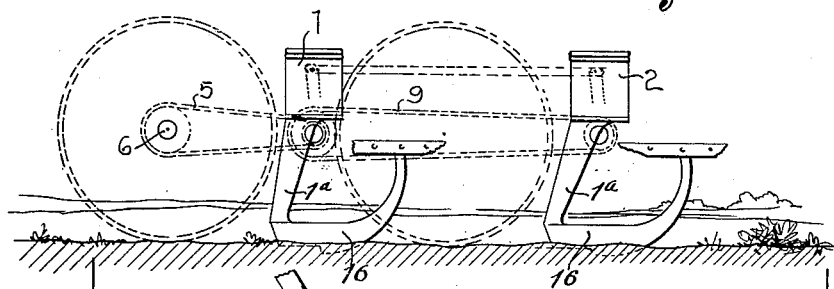
Figure 2:
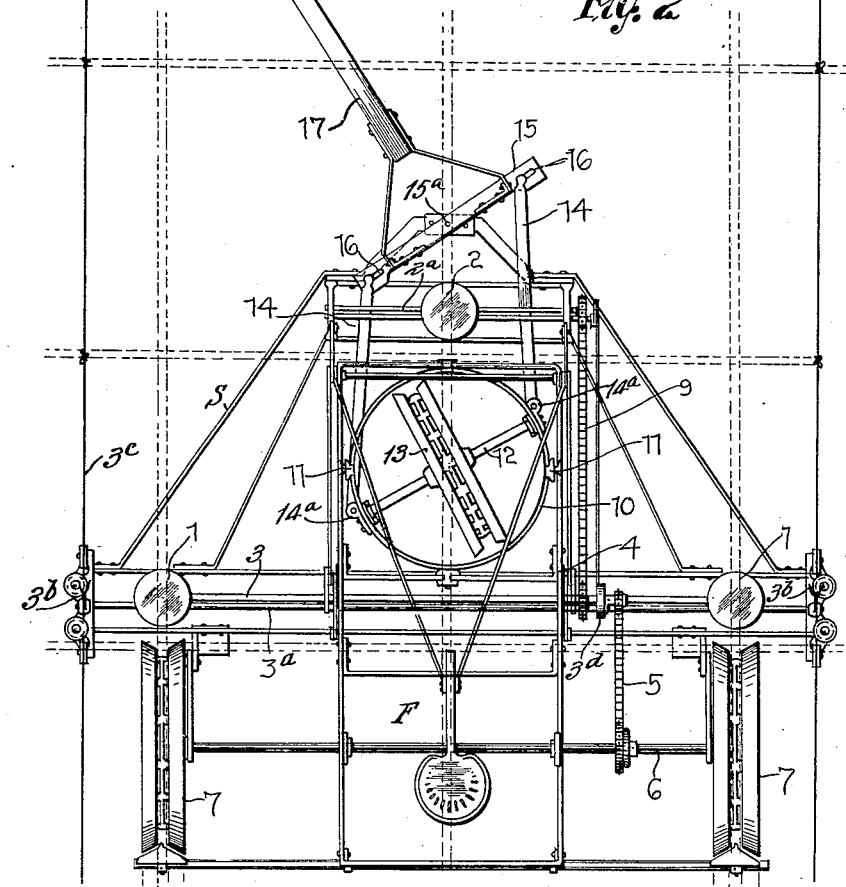

In the accompanying drawings Figure 1 is a diagrammatic side view of a corn planter embodying my invention. Fig. 2 is a plan view.

Referring to the drawings, F represents as a whole a planter frame which is supported at its rear end upon the rotatable axle 6 and the ground wheels 7. The forward part of the frame F is supported on the ground wheel 13 which is connected by means of the axle 12 to the fifth wheel structure 10. Suitable connections between the fifth wheel structure and the planter frame are provided at 11, 11.

15 is a transverse draft bar pivotally connected at 15$^a$ to the forward end of the frame. A draft tongue 17 is suitably connected to the bar 15. 14, 14 are two links each connected at its rear end to the movable part of the fifth wheel structure, preferably by means of pivots 14$^a$, 14$^a$ at points adjacent the ends of the axle 12. The forward ends of the links 14, 14 are connected to the ends of the bar 15, preferably by means of slots 16, 16. By means of the construction which I have described, the wheel 13 is always maintained in substantially parallel relation to the tongue 17. When the tongue is swung, the wheel is correspondingly swung to steer the planter.

A secondary frame S is provided upon which are mounted three separate seeder devices 1, 1, and 2, each of which is provided with a seed boot 1$^a$ and a furrow opening runner 1$^b$. Each seeder device is located closely adjacent one of the ground wheels and is preferably directly in advance thereof. The peripheries of the ground wheels are preferably beveled from each side inward and the wheels are therefore adapted to cover the seeds deposited by the seeder devices. The rear seeder devices 1, 1 are driven by means of a transverse seeder shaft 3 which receives its power by means of a chain 5 from the axle 6. The forward seeder device 2 is driven from a shaft 2ª which receives its power from the shaft 3 by means of a chain 9.

3ª is a transverse rock shaft and mounted upon the ends of this rock shaft are forks 3ᵇ, 3ᵇ, each adapted to be engaged by the tappets of a check row wire 3ᶜ. The transmission of power to the shafts 3 and 2ª and to the seeder devices 1, 1, and 2, is controlled through the clutch 3ᵈ by means of the oscillatory movement of the shaft 3ª when one of the forks is engaged by the wire. The forward seeder device 2 is located a distance in advance of the devices 1, 1, equal to the distance between the adjacent tappets of the wire, the mechanism 2 thus serving to deposit its seeds one hill in advance of the other devices.

It will be observed that my improved planter is provided with three triangularly arranged supporting wheels and that it will therefore readily adapt itself to irregularities of the ground. Each seeder device being closely adjacent a wheel, it is held at a proper elevation and a uniform depth of planting is insured. The provision of a third forward wheel relieves the draft animals from the load which they are forced to carry when a two wheeled planter is used, and the mounting of this forward wheel for oscillation about an axis behind the point of connection of the tongue makes it possible for the planter to be turned as sharply as a two wheeled planter can be turned.

What I claim is:—

1. In a corn planter of the kind described, driving wheels, a single steering wheel and a set of seed boxes located in triangular relation to each other in advance of the driving and steering wheels.

2. In a corn planter of the kind described, driving wheels, a single steering wheel, a seed box located in advance of each of said wheels, and a fifth wheel in which said steering wheel is mounted.

3. In a corn planter of the kind described, a single steering wheel, a movable draft tongue, an operating connection between tongue and the steering wheel, and a seed box located in advance of said single steering wheel.

4. In a corn planter of the kind described, a pair of driving wheels, a seed box in front of each driving wheel, a fifth wheel, and a steering wheel mounted in said fifth wheel in advance of the driving wheels, and a seed box located in advance of the steering wheel.

5. In a three row corn planter, a pair of driving wheels spaced a distance equal to twice the distance between two adjacent rows to be planted, planting means immediately in advance of each of said wheels whereby the wheels act as covering wheels, a steering wheel carried in advance of the driving wheels and positioned to travel over the row intermediate the rows covered by the driving wheels, and seed planting means in front of said steering wheel whereby the steering wheel also acts as a covering wheel.

In testimony whereof I hereunto affix my signature in presence of two witnesses.

DEWEY D. STEPHENS.

Witnesses:
LEWIS EVANS,
M. L. MILLER.

Copies of this patent may be obtained for five cents each, by addressing the " Commissioner of Patents, Washington, D. C."